June 9, 1959  R. B. DOTY  2,889,716
VARIABLE AND REVERSING POWER TRANSMISSION
Filed Dec. 20, 1955

INVENTOR.
Richard B. Doty
BY Victor J. Evans & Co.
ATTORNEYS

United States Patent Office 2,889,716
Patented June 9, 1959

2,889,716
VARIABLE AND REVERSING POWER TRANSMISSION

Richard B. Doty, Arlington, Tex.

Application December 20, 1955, Serial No. 554,276

2 Claims. (Cl. 74—689)

This invention relates to power transmission and speed changing devices of the automatic type in which clutches and shifting gears are not required, and in particular a power input or driving shaft, an output or driven shaft, a counter shaft, a fixed pitch pulley mounted on the driving shaft, a variable pitch pulley mounted on the counter shaft and aligned with the fixed pitch pulley of the driving shaft, a fixed pitch pulley mounted on the counter shaft, a variable pitch pulley mounted to rotate on the driving shaft and aligned with the fixed pitch pulley of the counter shaft, belts trained over the pulleys of the driving and counter shafts, and a planetary gear assembly connecting the variable pitch pulley rotatably mounted on the driving shaft to the driven shaft.

The purpose of this invention is to provide an improved transmission in which the parts are adapted to be shifted to a neutral position without the use of a clutch and wherein speed changes are obtained by shifting one shaft in relation to another.

Various types of transmissions and speed changing devices have been provided, however, particularly in automatic transmissions of motor vehicles a plurality of clutches are used and clutches, brakes and other similar devices, which are subjected to abuse in the normal operation of a motor vehicle wear rapidly and require repair constantly. With this thought in mind this invention contemplates a variable speed transmission in which fixed pitch pulleys are used in combination with variable pitch pulleys whereby in shifting relative positions of the pulleys substantially any speed desired may be obtained and the different speeds are produced without clutches or brakes.

The object of this invention is, therefore, to provide a speed changing device in which shifting of gears is not required.

Another object of the invention is to provide a transmission in which speed or speed ratio changes can be made without changing the speed of the power input.

Another important object of the invention is to provide a transmission in which an infinite number of speed changes may be obtained.

A further object of the invention is to provide an improved transmission which is of a simple and economical construction.

With these and other objects and advantages in view the invention embodies a power input or driving shaft, a power output or driven shaft aligned with the driving shaft, a planetary gear assembly connecting the driving shaft to the driven shaft, a variable pitch pulley rotatably mounted on the driving shaft, a belt trained over the variable pulley and also trained over a fixed pitch pulley on a counter shaft and a belt trained over a variable pitch pulley on the counter shaft and also over a fixed pitch pulley on the driving shaft.

Other features and advantages of the invention will appear from the following description taken in connection with the drawing, wherein.

Figure 1:
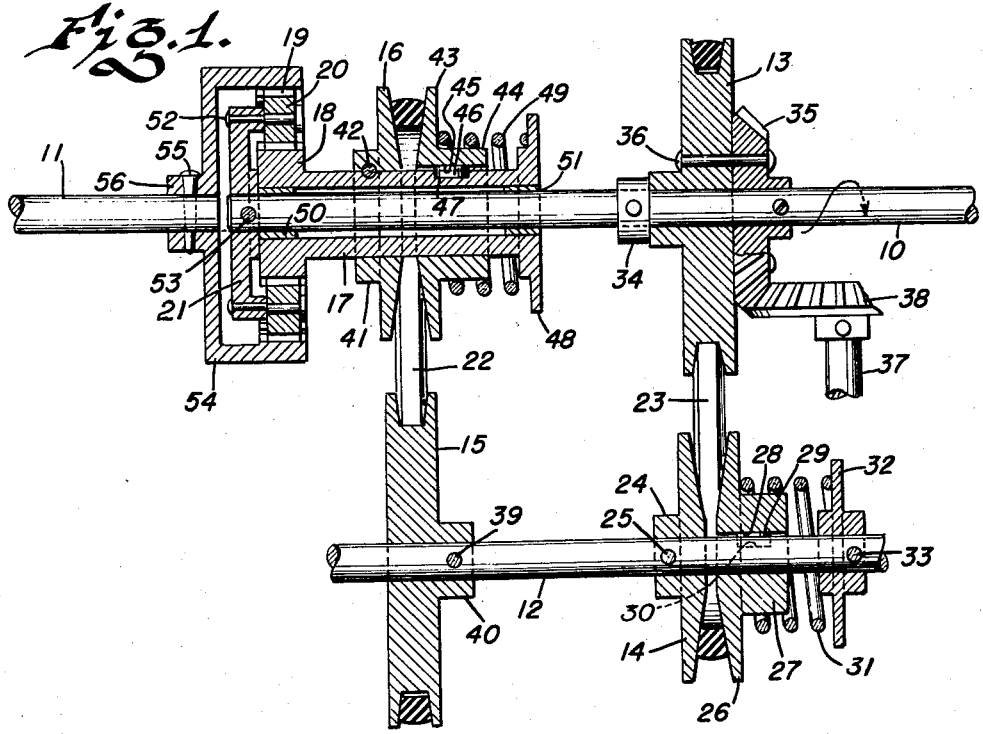
Figure 1 is a longitudinal section through the improved transmission with mounting and other elements omitted.

Referring now to the drawing wherein like reference characters denote corresponding parts the variable and reversing transmission of this invention includes a power or driving shaft 10, a driven shaft 11, a counter shaft 12, a pulley 13 mounted on the driving shaft, a variable pitch pulley 14 mounted on the counter shaft, a pulley 15 also mounted on the idler or counter shaft 12, a variable pitch pulley 16 mounted on a sleeve 17 extended from the sun gear 18 of a planetary gear assembly having an internal ring gear 19, planetary gears 20 and a yoke 21 mounted on the end of the driving shaft and on which the planetary gears are carried, and a belt 22 trained over the pulleys 15 and 16 and a similar belt 23 trained over the pulleys 13 and 14.

The stationary member or flange 5 of a variable pitch pulley 14 is provided with a hub 24 through which a pin 25 extends for securing the stationary member to the shaft 12 and a movable member or flange 26 is provided with a hub 27 with a groove 28 extended therethrough, the groove 28 being positioned to receive a key 29 positioned in a slot 30 in the shaft whereby the member 26 is free to slide longitudinally on the shaft and, at the same time, rotate with the shaft and also with the stationary member carried by the hub 24.

The variable pitch pulleys 14 and 16 include stationary flanges with conical-shaped faces and spring actuated slidably mounted flanges having conical-shaped faces, the conical-shaped faces of the spring actuated flanges being in opposed relation to the conical-shaped faces of the stationary flanges.

The member 26 of the variable pitch pulley is urged toward the stationary member with a spring 31, one end of which is positioned around the hub 27. The opposite end of the spring is seated against a disc 32 carried by a hub that is secured to the shaft 12 with a pin 33.

The belts 22 and 23 are of the V-type although it will be understood that belts of other suitable designs may be used.

The pulley 13 is fixedly mounted on the shaft 10 and upon movement of the shaft 12 away from the shaft 10 the belt 23 is drawn inwardly toward the center of the variable pitch 14 changing the pitch diameter and increasing the speed of the shaft 12.

A set collar 34 may be provided on the shaft 10, at the end of the hub of the pulley 13 and a beveled gear 35 may be secured to the pulley 13 with suitable fasteners 36 to provide means for operating a timer, pump or other auxiliary device through a shaft 37 on which is a beveled gear 38 that meshes with the gear 35.

The pulley 15 is fixedly mounted on the shaft 12 with a pin 39 that extends through a hub 40 thereof and the variable pitch pulley 16, which is aligned with the pulley 15 is provided with a stationary member having a hub 41 which is secured to the sleeve 17 with a key 42. The movable flange 43 of the pulley 16 is provided with a hub 44 in which a slot 45 is positioned and, as shown in Fig. 1, a key 46, mounted in a recess 47 in the sleeve 17, extends into the slot 45 causing the flange 43 to rotate with the stationary section of the pulley. The extended end of the sleeve 17 is provided with a flange 48 that provides a seat for a spring 49, the opposite end of which is positioned on the hub 44 of the flange 43. The sleeve 17 is rotatably mounted on the shaft 10 with bearings 50 and 51.

The yoke 21 on which the planetary gears 20 are rotatably mounted with the shafts 52 is secured on the shaft 10 with a pin 53 and the housing 54 with the ring gear 19 is secured to the driven or output shaft 11 with a pin 55 that extends through a hub 56 of the housing.

The counter shaft 12 is rotatably mounted in bearings 57 on the ends of arms 58 which are mounted on a pivot shaft 59 and the shaft is actuated by a hand lever 60 to move the shaft 11 toward the shaft 10 or away from the shaft, as may be desired.

The hand lever 60 is provided with a grip 61 which is pivotally mounted on the lever with a pin 62 and which is connected by a link 63 to a latch 64 slidably mounted in a bearing 65 and positioned to engage teeth 66 of a stationary rack 67. By this means the lever 60 is adapted to be set whereby the belts 22 and 23 operate in a neutral position, as shown in Fig. 2 or in various forward or reverse positions, as indicated by the arrow 68.

Figure 2:
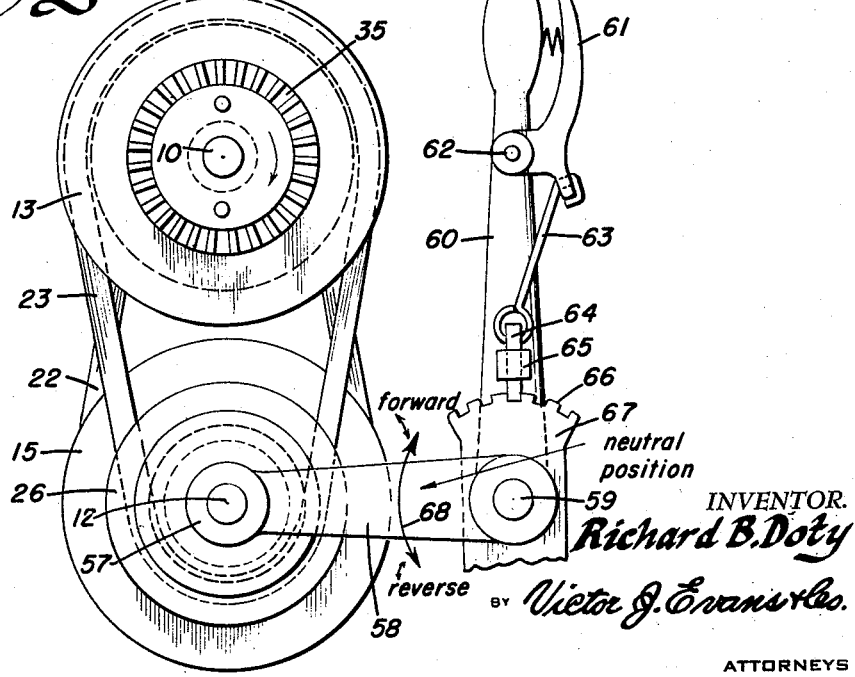
Figure 2 is an end elevational view of the transmission looking toward the end on which the driving shaft is positioned.

With the parts positioned as illustrated and described and with the power input shaft 10 rotating in a clockwise direction looking toward the end of the shaft, as shown in Fig. 2, the yoke 21 carrying the planetary gears 20 rotates around the inside of the ring gear 19 and if the ring gear is to remain stationary the sun gear 18 must be permitted to turn in a similar direction to and at a speed greater than that of the yoke 21. The sun gear, however, rotates at a definite ratio in relation to the yoke. This is accomplished by moving the shaft 12 toward or away from the power input shaft 10 in which movement the belt actuates the variable pitch pulleys to change the speed as desired. The compression springs 30 and 49 permit the belts to move in toward the center as the shaft 12 is moved away from the shaft 10 and the power of the springs crowds the belts outwardly, away from the center as the shaft 12 approaches the shaft 10.

A neutral position is accomplished by positioning the shaft 12 so that the ratio between the pulleys 13 and 16 is the same as that between the yoke 21 and the sun gear 18.

To rotate the output or driven shaft 11 in reverse the shaft 12 is moved away from the shaft 10 causing the sun gear 18 to operate at greater speed thereby reversing the ring gear 19 and the more the distance between the shafts 12 and 10 is increased the greater will be the speed of the output or driven shaft.

Moving the shaft 12 toward the shaft 10 causes variable driving or forward speeds and with this combination of parts the number of forward speeds will be indefinite.

The drawing illustrates a typical assembly and it will be understood that the parts may be connected to driving and driven elements and also provided with suitable mounting means as may be desired.

It will be understood that modifications, within the scope of the appended claims, may be made in the design and arrangement of the parts without departing from the spirit of the invention.

What is claimed is:

1. In a variable speed transmission, the combination which comprises a driving shaft, a driven shaft positioned in alignment with the driving shaft, a countershaft spaced from and parallel to the driving and driven shafts, a V-belt pulley fixedly mounted on the driving shaft, a flange having a conical-shaped face fixedly mounted on the countershaft, a complementary flange also having a conical-shaped face slidably mounted on the countershaft and positioned in opposed relation to the fixedly mounted flange, a disc fixedly mounted on the countershaft and spaced from the slidably mounted flange, a spring positioned between the disc and slidably mounted flange for urging the slidably mounted flange toward the stationary flange, a V-belt pulley fixedly mounted on the countershaft, a sleeve rotatably mounted on the driving shaf, a flange having a conical-shaped face fixedly mounted on the sleeve, a complementary flange also having a conical-shaped face slidably mounted on the sleeve and positioned in opposed relation to the fixedly mounted flange, a disc fixedly mounted on the sleeve and spaced from the slidably mounted flange thereon, a spring positioned between the disc of the sleeve and the slidably mounted flange thereon for urging the slidably mounted flange toward the stationary flange of the sleeve, means for operatively connecting the sleeve to the driven shaft, and means for moving the countershaft, selectively, toward or away from the driving shaft whereby V-belts trained over the V-belt pulleys and flanges having the conical-shaped faces spread the flanges to increase the speed of the countershaft and sleeve or permit the flanges to contract to reduce the speed of the countershaft and sleeve.

2. In a variable speed transmission, the combination which comprises a driving shaft, a driven shaft positioned in alignment with the driving shaft, a sleeve rotatably mounted on the driving shaft, means operatively connecting the sleeve to the driven shaft, a countershaft spaced from and parallel to the driving shaft, a V-belt pulley fixedly mounted on the driving shaft, a flange having a conical-shaped face fixedly mounted on the countershaft, a complementary flange also having a conical-shaped face slidably mounted on the countershaft and positioned with the conical-shaped face thereof in opposed relation to the conical-shaped face of the flange fixedly mounted on the countershaft, a disc fixedly mounted on the countershaft and spaced from the slidably mounted flange, a spring positioned between the disc and slidably mounted flange for urging said flange toward the stationary flange, a V-belt trained over the V-belt pulleys and flanges, a V-belt pulley fixedly mounted on the countershaft, a flange having a conical-shaped face fixedly mounted on the sleeve, a complementary flange also having a conical-shaped face slidably mounted on the sleeve and positioned in opposed relation to the face of the flange fixedly mounted on the sleeve, a disc fixedly mounted on the sleeve, a disc fixedly mounted on the sleeve and spaced from the flange slidably mounted thereon, a spring positioned between the disc and flange slidably mounted on the sleeve for urging the flange slidably mounted on the sleeve toward the stationary flange thereon, a V-belt pulley fixedly mounted on the countershaft and aligned with the flanges having conical-shaped faces of the sleeve, a belt trained over the V-belt pulley on the countershaft and flanges having conical-shaped faces of the sleeve, a pivot shaft spaced from and parallel to the countershaft, arms carried by the pivot shaft and having bearings in extended ends in which the countershaft is mounted, a hand lever mounted on and extended from the pivot shaft, and a latch for locking the hand lever and countershaft in adjusted positions.

References Cited in the file of this patent

UNITED STATES PATENTS

| 1,127,203 | De Young | Feb. 2, 1915 |
| 1,243,240 | Allen | Oct. 16, 1917 |
| 1,752,708 | Stewart | Apr. 1, 1930 |
| 2,031,712 | Jannin | Feb. 25, 1936 |
| 2,164,818 | Heyer et al. | July 4, 1939 |
| 2,179,053 | Reeves | Nov. 7, 1939 |
| 2,181,373 | Kent | Nov. 28, 1939 |
| 2,202,384 | Jacobsen | May 28, 1940 |
| 2,446,462 | Dodge | Aug. 3, 1948 |

FOREIGN PATENTS

| 495,853 | Great Britain | 1938 |